United States Patent [19]
Summerfield

[11] 3,763,969
[45] Oct. 9, 1973

[54] SIMPLIFIED GOVERNOR
[75] Inventor: William F. Summerfield, Huntington Beach, Calif.
[73] Assignee: Mattel, Inc., Hawthorne, Calif.
[22] Filed: July 24, 1972
[21] Appl. No.: 274,774

[52] U.S. Cl. .............................................. 188/184
[51] Int. Cl. ............................................ F16d 59/00
[58] Field of Search ............... 188/180, 181 A, 184, 188/185

[56] References Cited
UNITED STATES PATENTS
1,453,182  4/1923  Rivetta ............................ 188/184

*Primary Examiner*—Duane A. Reger
*Attorney*—Seymour A. Scholnick

[57] ABSTRACT

A governor which includes a shaft having an enlargement and which is rotatably mounted in a housing, a weight pivotally mounted on the shaft enlargement so the ends of the weight can move out and against the housing to slow the shaft, and a leaf spring which biases the weight inwardly and which engages flat surfaces of the shaft enlargement to transmit torque between the shaft and weight. The housing is a single piece injection molded part with a cup-shaped body which carries a pair of straps near its open end, and with bearing members at the ends of the straps. The bearing members, which have bearing recesses, can be mounted on the open end of the housing with the recesses forming a shaft bearing.

8 Claims, 6 Drawing Figures

PATENTED OCT 9 1973 3,763,969
SHEET 2 OF 2
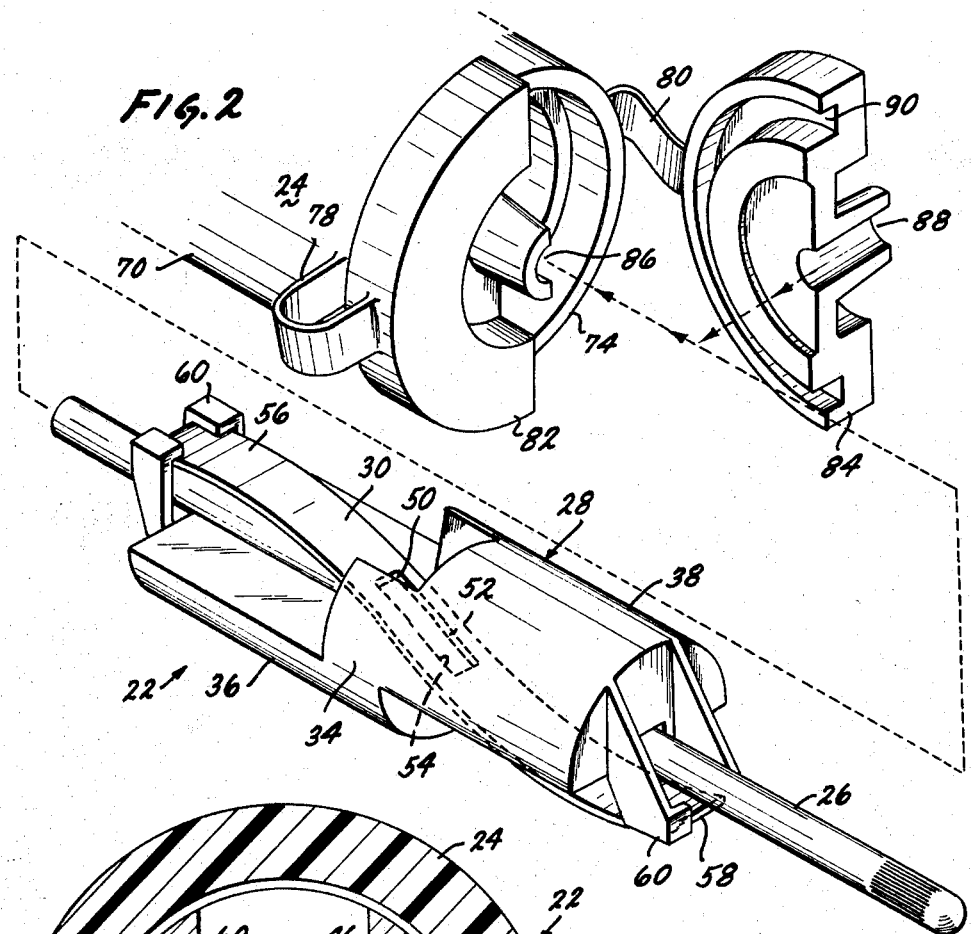
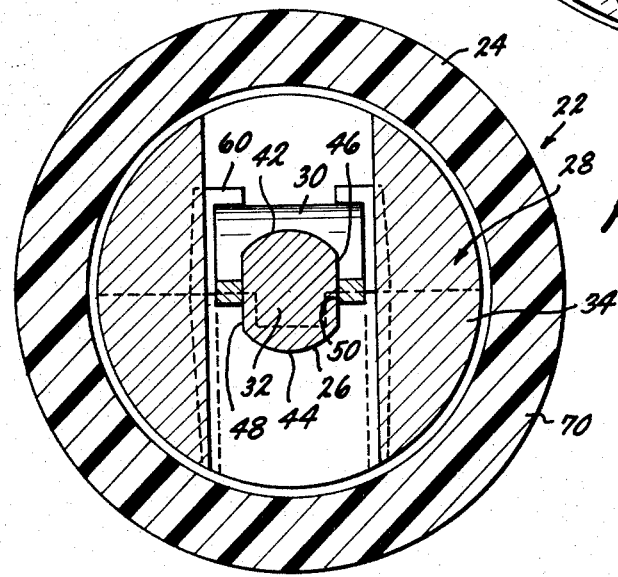
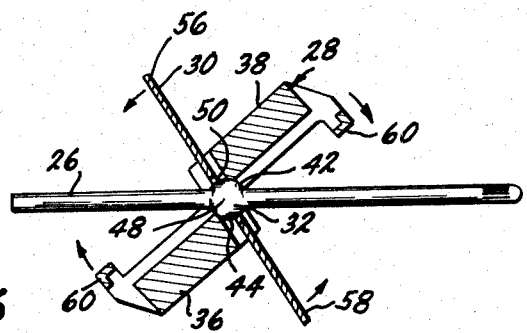

SIMPLIFIED GOVERNOR

BACKGROUND OF THE INVENTION

Governors are utilized in a wide variety of devices to regulate the speed of motors, and a large number of them are utilized in toys. One common type of governor includes a pair of weights pivotally mounted on a shaft and one or more springs to resiliently resist outward movement of the weights. When the shaft rotates rapidly, the weights are moved outward by centrifugal force against the spring restraint, so that the weights bear against the housing to reduce the speed of the shaft. While these governors are not particularly complicated, an even greater simplification, by reducing the number of parts and/or simplifying the parts, would permit the toys or other mechanisms which utilize the governors to be produced at even lower cost. Furthermore, a simplification of the parts could permit greater uniformity which would allow the governors to control the shaft speed with greater accuracy.

SUMMARY OF THE INVENTION

In accordance with one embodiment of the present invention, a governor is provided which utilizes a minimum number of simple parts. The governor includes a shaft rotatably mounted in a governor housing, a weight having a center portion pivotaly mounted on the shaft and opposite ends lying on opposite sides of the shaft so that centrifugal force causes pivoting of the weight in a direction to contact the housing, and a leaf spring which urges the weight to pivot in a direction opposite to centrifugal forces. The shaft has an enlarged center portion with a pair of rounded surfaces which serve as pivot bearings for the weight, and with a pair of flat surfaces for engaging the spring. The spring is a strip of resilient material with a slot at its center which receives the enlarged portion of the shaft, and the spring has opposite ends deflected into engagement with the opposite ends of the weight to bias them away from contact with the housing. The slot has straight sides that are closely received between the flat surfaces of the enlarged shaft portion, so that the spring transmits torque between the shaft and the weight.

The housing of the governor is cup-shaped, with a cylindrical side wall, a closed end having a bearing recess formed therein, and an originally opened end. Two straps integral with the housing extend from either side of the open end, and a pair of bearing members are formed integrally with the outer ends of the straps. The bearing members can be mounted over the originally opened end of the housing to close it. Each of the bearing members has a recess, so that when the bearing members are mounted in place, the two recesses form a bearing for the shaft. The housing can be formed as a single injection molded article, to permit low cost construction.

The novel features of the invention are set forth with particularity in the appended claims. The invention will best be understood from the following description when read in conjunction with the accompanying drawings.

BRIEF DESCRIPTION OF THE DRAWINGS

FIG. 2 is a partial perspective view of the governor mechanism of FIG. 1;

FIG. 5 is a view taken on the line 5—5 of FIG. 3; and

FIG. 6 is a partially sectional side view of the governor mechanism, showing how it is assembled.

DESCRIPTION OF THE PREFERRED EMBODIMENT

Figure 1:
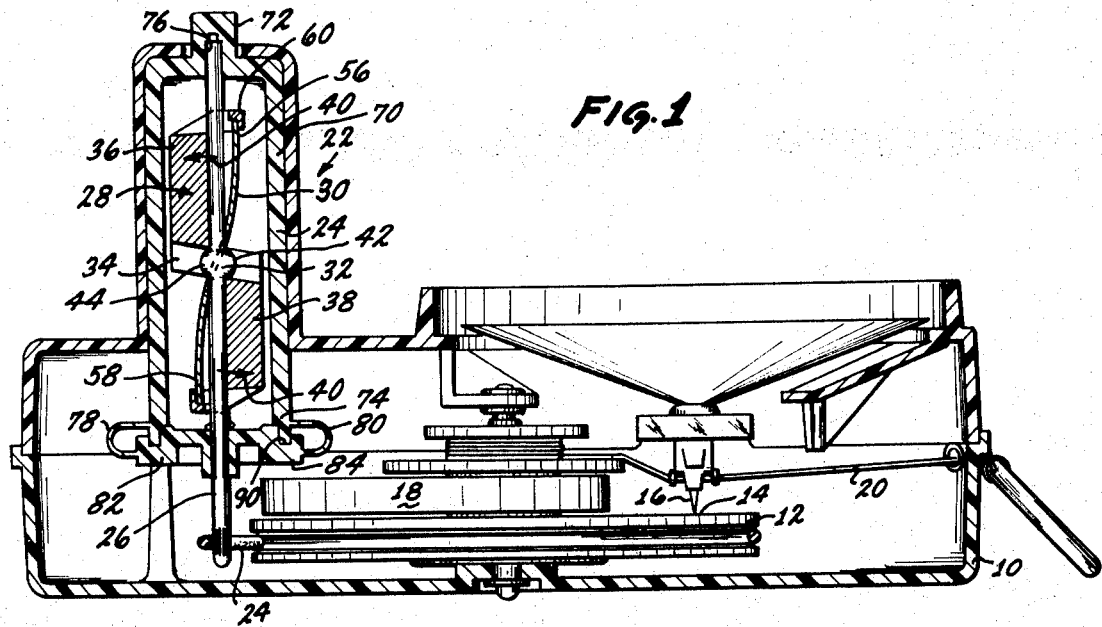
FIG. 1 is a sectional side view of a toy voice unit which includes a governor constructed in accordance with the invention.

FIG. 1 illustrates a voice unit which includes a frame 10, a turntable 12 rotatably mounted on the frame and carrying a record 14, and a stylus 16 for playing the record as the turntable rotates. The turntable is rotated during playing by a spring 18, the spring being wound before each playing when a child pulls on a pull cord 20. The speed at which the spring 18 turns the turntable 12 is regulated by a governor 22 which is connected by a belt 24 to the turntable.

The governor 22 is a self-contained module including its own housing 24 that serves as the sole bearing support for the governor shaft 26. In addition to the housing 24 and shaft 26, the governor includes brake or weight 28 that is pivotaly mounted on the shaft, and a leaf spring 30 which is engaged with the shaft and weight. The governor can be constructed with only these four parts, and constitutes a self-contained unit that can be tested apart from the rest of the voice unit and which can be mounted in a simple manner in the voice unit.

The shaft 26 is constructed with an enlarged center portion 32. The weight 28 has a center portion 34 pivotaly mounted on the enlarged shaft portion, and also has a pair of opposite ends 36, 38 which lie on opposite sides of the shaft 26 and which are spaced from one another along the axis of the shaft. When the shaft 26 rotates with the weight 28, centrifugal forces urge the weight to pivot in a direction indicated by arrows 40 so that the opposite ends 36, 38 move radially outwardly and against the walls of the housing 24. The friction resulting from the weight bearing against the housing produces a drag that reduces the speed of shaft rotation. The surfaces of the weight and/or housing which can engage one another can be provided with high friction material, although this is generally unnecessary. The spring 30 prevents the weight from pivoting into engagement with the housing until the shaft reaches a predetermined speed. The spring 30 is preloaded so that when the centrifugal force on the weight begins to exceed the preload of the spring, the weight can begin pivoting. At a rotational speed where the centrifugal force is only slightly greater than the spring preload, the weight will have moved far enough to engage the walls of the housing and prevent any further increase in the speed of the shaft.

Figure 3:
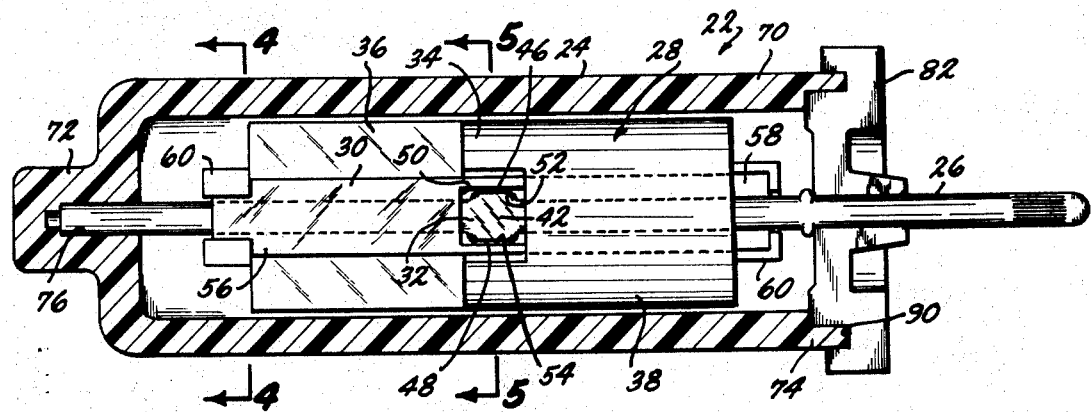
FIG. 3 is a sectional side view of the governor of FIG. 1.
Figure 4:
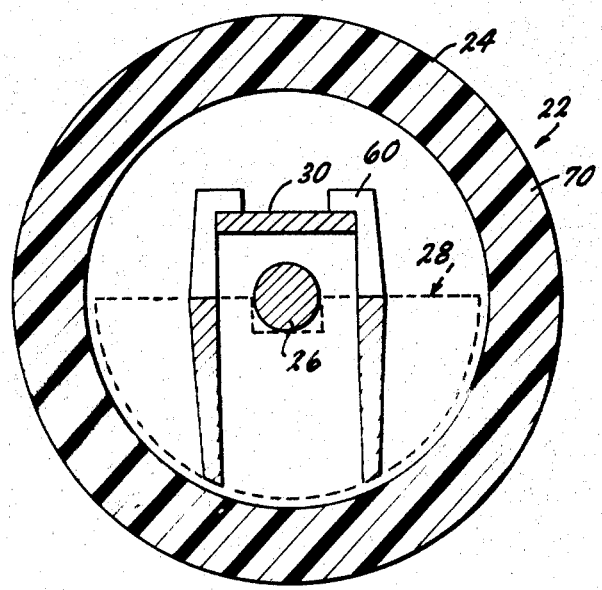
FIG. 4 is a view taken on the line 4—4 of FIG. 3.

The enlarged portion 32 of the shaft has rounded surfaces at 42 and 44 where it engages the center portion 34 of the weight, to provide close control of the position of the weight while permitting low friction pivoting of the weight on the shaft. In addition, the enlarged center portion 32 has a pair of flat surfaces 46, 48 (FIGS. 3 and 5) for engaging the spring 30.

The spring 30 is constructed of a strip of resilient material such as spring steel, and it has a slot 50 at its center. The shaft 26 passes through the slot 50, with the flat surfaces 46, 48 of the enlarged shaft portion lying against the side walls 52, 54 of the slot. This arrangement prevents relative turning of the spring on the shaft, so that the shaft can transmit torque through the spring to the weight.

The spring has opposite ends 56, 58 which extend in a bow to the opposite ends 36, 38 of the weight. As shown in FIG. 2, each end of the weight is formed with a pair of brackets 60 which can capture an end of the spring to hold it in a deflected configuration. The spring 30 can be constructed so it is flat in a deflected state, and therefore provides a preload when mounted on the shaft and engaged with the ends of the weight. The preload provided by the spring urges the weight to pivot in a direction opposite to that provided by centrifugal force. When the shaft is not rotating or rotating only slowly, the spring keeps the ends 36, 38 of the weight against the shaft, and therefore away from the walls of the housing 24.

The weight and spring can be assembled on the shaft in the manner illustrated in FIG. 6. The spring 30 is first inserted through the open center of the weight, with the spring extending substantially perpendicular to the length of the weight, and the shaft 26 is then inserted through both the weight and spring to the position of FIG. 6. The weight portions that bear against the shaft at 42 and 44 are far enough apart to permit reception of the shaft when the weight is at a large angle with the shaft. The weight 28 is then pivoted in the direction indicated in the figure so its ends 36, 38 lie against the shaft, and the ends of the spring 30 are bowed and inserted within the brackets 60 at the ends of the weight. It may be noted that the spring is maintained in a bowed configuration because it is held at four locations along its length. These four locations are at its two opposite ends where it is held by the brackets 60 on the weight, and at the ends of the spring slot 50 where the spring bears against portions of the shaft spaced from either end of the enlarged shaft portion. AFter the shaft, weight, and spring are assembled, the assembly can be installed in the governor housing 24.

The governor housing 24 is designed for manufacture at low cost by injection molding it as a unitary item. The housing 24 includes a cup-shaped part with a cylindrical side wall 70, a first end 72 that is closed, and a second end 74 that is initially open. The first end 72 has a cylindrical depression 76 that forms a bearing for one end of the shaft 26. The other end 74 can form a second bearing for the shaft. As best shown in FIG. 2, the housing has a pair of straps 78, 80 formed integrally therewith at the second end 74, and a pair of bearing members 82, 84 are formed integrally with the straps at their outer ends. Each of the bearing members 82, 84 has a bearing recess 86, 88 which forms half of a cylindrical bearing so that when the bearing members are mounted against one another on the originally open end 74 of the housing, the two bearing recesses 86, 88 form a shaft bearing. The bearing members also have grooves 90 that can be received on the end 74 of the housing, to facilitate mounting thereon. If desired, an adhesive or other fastening means can be applied to the bearing members after they are mounted on the end 74 of the housing to more securely hold them in place.

The housing 24, can be formed as a single item in an injection molding process, using a material such as a plastic which is at least partially flexible in thin sections, to permit bending of the strips 78, 80. The formation of the housing as a single item reduces the number of separate parts that must be stored and handled, so that assembly of the housing is simplified. The use of a housing which can rotatably support the governor shaft by itself enables the governor to be constructed as an independent unit apart from the rest of the voice unit. This enables the governor to be tested or graded apart from the rest of the voice unit, so that defective governors can be rejected without rejecting an entire voice unit. Also, assembly of the governor in the frame of the voice unit is simpler and less critical.

Thus, the invention provides a simple governor which utilizes a minimum number of simple parts which can be simply assembled. The use of a simple strip-shape leaf spring for the governor helps to assure accuracy, inasmuch as flat stamped springs can be more uniformly manufactured than can other types of springs. The governor is useful in a wide variety of toys and other devices to regulate speed of rotation. The shaft, weight and spring assembly can be mounted in a variety of housings, which do not have to completely surround the assembly and which may hold additional mechanisms. Also, the construction of the housing which utilizes an integral member that forms a chamber with a pair of shaft bearings described above, is useful not only in the governor but in a variety of other devices where a housing is desired for rotatably supporting a shaft to other members.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A governor comprising:
    a housing;
    a shaft rotatably mounted in the housing;
    a weight having a center portion disposed on the shaft for pivoting thereon and having opposite end portions lying on opposite sides of the shaft and at locations axially spaced in different directions from the center portion, so that centrifugal forces urge pivoting of said weight in a first direction to move the opposite end portions outwardly towards the walls of the housing; and
    a leaf spring having a central portion disposed on said shaft and opposite end portions engaged with the opposite end portions of the weight, said leaf spring being in a deflected condition so it urges said weight to pivot in a direction opposite to said first direction.

2. The governor described in claim 1 wherein:
    said shaft has an enlarged center portion which is rounded at portions facing said opposite end portions of said weight, said rounded portions being engaged with said weight to pivotally support it, said weight constructed so the shaft can pass through it when the weight is pivoted in said first direction by an angle larger than is permitted by the housing when the weight and shaft are in the housing.

3. The governor described in claim 1 wherein:
    the center portion of said leaf spring has a slot which receives said shaft, and the spring bears against the shaft at the opposite ends of the walls of the slot, each end portion of the spring entending in a curve between the location at the slot where it bears against the shaft and the location engaged with the weight.

4. The governor described in claim 1 wherein:
one end of said housing includes an open end portion and a pair of bearing halves connected by thin flexible connectors that are integral with said housing end portion and with respective bearing halves, said bearing halves including bearing recesses and said halves being mountable on said open end portion with the recesses forming a bearing rotatably supporting said shaft.

5. A governor comprising:
a housing;
a shaft rotatably mounted in the housing;
a brake having a center portion pivotably mounted on the shaft and having opposite end portions, at least one end portion positioned to contact the housing when the brake pivots in a first direction, said brake being urged by centrifugal forces to pivot in said first direction as it rotates with the shaft; and
an elongated resilient member having a slot which receives said shaft and having opposite end portions of said brake to urge it to pivot in a direction opposite to said first direction.

6. The governor described in claim 5 wherein:
said shaft has a noncircular center portion; and
the slot in said resilient member closely receives said shaft portion to prevent rotation thereon, whereby the resilient member transmits rotational torque from the shaft to the brake.

7. A governor comprising:
a housing;
a shaft rotatably mounted on the housing, said shaft having an enlarged center portion which is rounded on a first pair of opposite surfaces thereof and which is substantially flat on a second pair of surfaces thereof;
a weight member having a center with a hole therein and opposite ends, the walls of said hole engaging said rounded surfaces of the shaft so the member can pivot on the enlarged center portion of the shaft about an axis perpendicular to the length of the shaft, said weight member mounted on the shaft so it is urged by centrifugal force to pivot in a first direction wherein the ends of the member move outward from the shaft, when the shaft rotates; and
a resilient member having a center portion extending through the hole in the center of the weight member, said resilient member having a slot with substantially flat sides closely receiving said flat second pair of shaft surfaces, and said resilient member having opposite ends engaged with the opposite ends of said weight member to urge the weight member to pivot in a direction opposite to said first direction.

8. The governor described in claim 7 wherein:
said resilient member assumes a flat strip shape when undeformed.

* * * * *